(12) United States Patent
Hawkins et al.

(10) Patent No.: US 6,839,464 B2
(45) Date of Patent: Jan. 4, 2005

(54) MULTIPLE PEN STROKE CHARACTER SET AND HANDWRITING RECOGNITION SYSTEM WITH IMMEDIATE RESPONSE

(75) Inventors: Jeffrey Charles Hawkins, Redwood City, CA (US); Joseph Kahn Sipher, Mountain View, CA (US); Ron Marianetti, II, San Jose, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

(21) Appl. No.: 10/218,479

(22) Filed: Aug. 13, 2002

(65) Prior Publication Data

US 2002/0196978 A1 Dec. 26, 2002

Related U.S. Application Data

(63) Continuation of application No. 08/925,563, filed on Sep. 8, 1997, now Pat. No. 6,493,464, which is a continuation of application No. 08/741,339, filed on Oct. 29, 1996, now abandoned, which is a continuation of application No. 08/270,025, filed on Jul. 1, 1994, now abandoned.

(51) Int. Cl.$^7$ ................................................. G06K 9/00
(52) U.S. Cl. ...................................... 382/187; 382/311
(58) Field of Search ................................ 382/189, 311, 382/187, 182, 229, 185, 188, 227, 315

(56) References Cited

U.S. PATENT DOCUMENTS

| | | | | |
|---|---|---|---|---|
| 4,972,496 A | * | 11/1990 | Sklarew | ..................... 382/187 |
| 5,500,937 A | * | 3/1996 | Thompson-Rohrlich | .... 345/764 |
| 5,592,566 A | * | 1/1997 | Pagallo et al. | .............. 382/187 |
| 5,596,656 A | * | 1/1997 | Goldberg | ..................... 382/186 |
| 5,717,939 A | * | 2/1998 | Bricklin et al. | ............. 715/503 |
| 6,493,464 B1 | * | 12/2002 | Hawkins et al. | ............ 382/189 |

OTHER PUBLICATIONS

GRiDPAD Computer Owner's Guide, Jan., 1990.*

* cited by examiner

Primary Examiner—Jon Chang

(57) ABSTRACT

A pen-based computer text input system capable of interpreting a special pre-defined set of single stroke glyphs. Each input stroke is identified with one of three categories: (1) pre-character modifier strokes, (2) character or symbol strokes, or (3) post-character modifier strokes. Pre-character modifier strokes precede character strokes and inform the present recognition system that a subsequently entered character stroke is to be modified by the pre-character modifier stroke in a pre-defined manner. Character strokes cause a character or symbol to be displayed on the display device the moment it is input on the writing tablet, interpreted in accordance with any pre-character modifier stroke. A post-character modifier stroke causes the recognition system to modify, in a pre-defined manner, a character or symbol which was previously entered and displayed. An important advantage of the present invention is its ability to provide immediate recognition of multiple stroke characters without using boxed input.

20 Claims, 13 Drawing Sheets

| A | B | C | D | E | F | G | H | I | J | K | L | M |
|---|---|---|---|---|---|---|---|---|---|---|---|---|
| \| | > | < | < | − | ⌈ | ⌋ | ⌐ | 1 | ⌋ | / | L | ∧ |

| N | O | P | Q | R | S | T | U | V | W | X | Y | Z |
|---|---|---|---|---|---|---|---|---|---|---|---|---|
| ∧ | ૪ | ⍴ | ⊲ | ⟍ | S | − | v | V | ⋂ | ૪ | / | Z |

FIG. 4b space            backspace            CRLF
    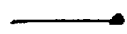    
non-printing characters
FIG. 5a
punctuation      capital shift     extended
        
pre-character modifier strokes
FIG. 5b
( ) ? $ % ! & (period) (comma)
( ) ? S ∞ ! 8 • /
common punctuation
FIG. 5c

® © ™ Σ α β μ

R C M Σ ∠ β M some extended symbols
FIG. 6

| USER WRITES | DISPLAY SHOWS |
|---|---|
| 1. S | S |
| 2. h | sh |
| 3. \| | ぅ |

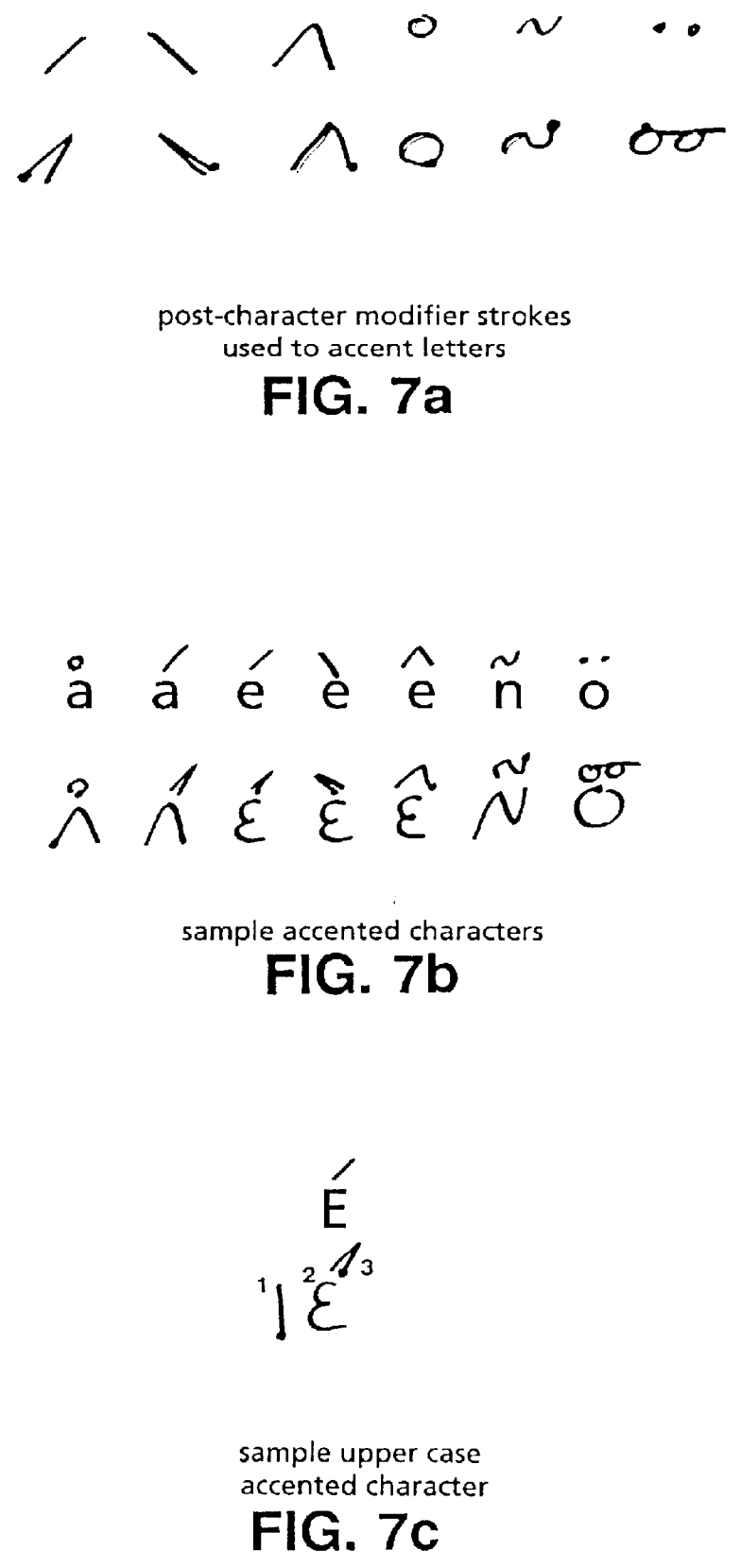

FIG. 9 post-character modifier strokes
used to accent letters
FIG. 7a sample accented characters
FIG. 7b sample upper case
accented character
FIG. 7c

Based on JIS X 0208

| | | | | |
|---|---|---|---|---|
| ア | KATAKANA LETTER SMALL A | | ト | KATAKANA LETTER TO |
| ア | KATAKANA LETTER A | | ド | KATAKANA LETTER DO |
| イ | KATAKANA LETTER SMALL I | | ナ | KATAKANA LETTER NA |
| イ | KATAKANA LETTER I | | ニ | KATAKANA LETTER NI |
| ウ | KATAKANA LETTER SMALL U | | ヌ | KATAKANA LETTER NU |
| ウ | KATAKANA LETTER U | | ネ | KATAKANA LETTER NE |
| エ | KATAKANA LETTER SMALL E | | ノ | KATAKANA LETTER NO |
| エ | KATAKANA LETTER E | | ハ | KATAKANA LETTER HA |
| オ | KATAKANA LETTER SMALL O | | バ | KATAKANA LETTER BA |
| オ | KATAKANA LETTER O | | パ | KATAKANA LETTER PA |
| カ | KATAKANA LETTER KA | | ヒ | KATAKANA LETTER HI |
| ガ | KATAKANA LETTER GA | | ビ | KATAKANA LETTER BI |
| キ | KATAKANA LETTER KI | | ピ | KATAKANA LETTER PI |
| ギ | KATAKANA LETTER GI | | フ | KATAKANA LETTER HU = FU |
| ク | KATAKANA LETTER KU | | ブ | KATAKANA LETTER BU |
| グ | KATAKANA LETTER GU | | プ | KATAKANA LETTER PU |
| ケ | KATAKANA LETTER KE | | ヘ | KATAKANA LETTER HE |
| ゲ | KATAKANA LETTER GE | | ベ | KATAKANA LETTER BE |
| コ | KATAKANA LETTER KO | | ペ | KATAKANA LETTER PE |
| ゴ | KATAKANA LETTER GO | | ホ | KATAKANA LETTER HO |
| サ | KATAKANA LETTER SA | | ボ | KATAKANA LETTER BO |
| ザ | KATAKANA LETTER ZA | | ポ | KATAKANA LETTER PO |
| シ | KATAKANA LETTER SI = SHI | | マ | KATAKANA LETTER MA |
| ジ | KATAKANA LETTER ZI = JI (not unique) | | ミ | KATAKANA LETTER MI |
| | | | ム | KATAKANA LETTER MU |
| ス | KATAKANA LETTER SU | | メ | KATAKANA LETTER ME |
| ズ | KATAKANA LETTER ZU | | モ | KATAKANA LETTER MO |
| セ | KATAKANA LETTER SE | | ャ | KATAKANA LETTER SMALL YA |
| ゼ | KATAKANA LETTER ZE | | ヤ | KATAKANA LETTER YA |
| ソ | KATAKANA LETTER SO | | ュ | KATAKANA LETTER SMALL YU |
| ゾ | KATAKANA LETTER ZO | | ユ | KATAKANA LETTER YU |
| タ | KATAKANA LETTER TA | | ョ | KATAKANA LETTER SMALL YO |
| ダ | KATAKANA LETTER DA | | ヨ | KATAKANA LETTER YO |
| チ | KATAKANA LETTER TI = CHI | | ラ | KATAKANA LETTER RA |
| ヂ | KATAKANA LETTER DI = JI (not unique) | | リ | KATAKANA LETTER RI |
| | | | ル | KATAKANA LETTER RU |
| ッ | KATAKANA LETTER SMALL TU = SMALL TSU | | レ | KATAKANA LETTER RE |
| ツ | KATAKANA LETTER TU = TSU | | ロ | KATAKANA LETTER RO |
| ヅ | KATAKANA LETTER DU = ZU (not unique) | | ヮ | KATAKANA LETTER SMALL WA |
| | | | ワ | KATAKANA LETTER WA |
| テ | KATAKANA LETTER TE | | ヰ | KATAKANA LETTER WI |
| デ | KATAKANA LETTER DE | | ヱ | KATAKANA LETTER WE |
| | | | ヲ | KATAKANA LETTER WO |
| | | | ン | KATAKANA LETTER N |
| | | | ヴ | KATAKANA LETTER VU |

FIG. 8

Katakana

| | | | | |
|---|---|---|---|---|
| KYA キャ | KYI キィ | KYU キュ | KYE キェ | KYO キョ |
| KUA クァ | KUI クィ | KUU クゥ | KUE クェ | KUO クォ |
| GYA ギャ | GYI ギィ | GYU ギュ | GYE ギェ | GYO ギョ |
| GUA グァ | GUI グィ | GUU グゥ | GUE グェ | GUO グォ |
| SHA シャ | SHI シ | SHU シュ | | SHO ショ |
| ZYA ジャ | ZYI ジィ | ZYU ジュ | ZYE ジェ | ZYO ジョ |
| TYA チャ | TYI チィ | TYU チュ | TYE チェ | TYO チョ |
| TSA ツァ | TSI ツィ | TSU ツ | TSE ツェ | TSO ツォ |
| DYA ヂャ | DYI ヂィ | DYU ヂュ | DYE ヂェ | DYO ヂョ |
| NYA ニャ | NYI ニィ | NYU ニュ | NYE ニェ | NYO ニョ |
| HYA ヒャ | HYI ヒィ | HYU ヒュ | HYE ヒェ | HYO ヒョ |
| BYA ビャ | | BYU ビュ | | BYO ビョ |
| PYA ピャ | | PYU ピュ | | PYO ピョ |
| MYA ミャ | | MYU ミュ | | MYO ミョ |
| RYA リャ | | RYU リュ | | RYO リョ |
| CHA チャ | CHI チ | CHU チュ | | CHO チョ |
| KKA ッカ | KKI ッキ | KKU ック | KKE ッケ | KKO ッコ |
| GGA ッガ | GGI ッギ | GGU ッグ | GGE ッゲ | GGO ッゴ |
| SSA ッサ | SSI ッシ | SSU ッス | SSE ッセ | SSO ッソ |
| ZZA ッザ | ZZI ッジ | ZZU ッズ | ZZE ッゼ | ZZO ッゾ |
| TTA ッタ | TTI ッチ | TTU ッツ | TTE ッテ | TTO ット |
| DDA ッダ | DDI ッヂ | DDU ッヅ | DDE ッデ | DDO ッド |
| HHA ッハ | | | | |
| BBA ッバ | BBI ッビ | BBU ッブ | BBE ッベ | BBO ッボ |
| PPA ッパ | PPI ッピ | PPU ップ | PPE ッペ | PPO ッポ |

FIG. 10

| Name | Stroke |
|---|---|
| Dot | . |
| Rectilinear Line | ( |
| Diagonal Line | / |
| Half Circle | C |
| N | N |
| Sigma | W |
| Right Angle | ⌐ |
| Fish | ∝ |
| Rectilinear Back&Forth | — |
| Diagonal Back&Forth | / |
| Y | Y |
| Circle | O |
| Eye Glasses | OO |
| Pigtail | ⌐/ |

| Name | Stroke |
|---|---|
| Simple P | P |
| Downstroke P | P |
| Simple B | B |
| Downstroke B | B |
| Simple D | D |
| Downstroke D | D |
| Q | O |
| Simple R | R |
| Downstroke R | R |
| Downstroke M | M |
| G | G |
| 8 | 8 |
| 9 | 9 |
| Vtail | V |

FIG. 11a

| Æ | Ɛ |
|---|---|
| Ç | C |

FIG. 11g

LETTER STROKES

| A | ∧ |
|---|---|
| B | B.B.3 |
| C | C |
| D | D.D |
| E | E |
| F | Γ |
| G | G.6 |
| H | h |
| I | ( |
| J | ⌐ |
| K | ∝ |
| L | L |
| M | M.M |

LETTER STROKES

| N | N |
|---|---|
| O | O.O |
| P | P.P |
| Q | O |
| R | R.R |
| S | S |
| T | ⌐ |
| U | U |
| V | U.V |
| W | W |
| X | X.X |
| Y | Y.Y |
| Z | Z |

FIG. 11b

| LETTER | STROKE |
|---|---|
| Space | — |
| Return | / |
| Up Arrow | ↑ |
| Down Arrow | ↓ |

| LETTER | STROKE |
|---|---|
| BS | — |
| Return | ⌐ |
| Left Arrow | — |
| Right Arrow | — |

FIG. 11c

| Period . | Comma , | Apostraphe ' | Question ? | Exclamation ! | Dash - | Left Paren ( | Right Paren ) | Slash / | Dollar $ |
|---|---|---|---|---|---|---|---|---|---|
| . | / | ( | ⌐ | ( | — | C | ) | / | S |

FIG. 11d

| CHAR | STROKE |
|---|---|
| @ | ○ |
| # | ⋈ |
| % | ⊽⊽ |
| ^ | ∧ |
| & | 8 |
| * | ∝ |
| < | ⊂ |
| > | ⊃ |

| CHAR | STROKE |
|---|---|
| underline | — |
| + | ⊗ |
| = | Z |
| [ | ε |
| ] | 3 |
| { | ε |
| } | 3 |
| \| | ( |

| CHAR | STROKE |
|---|---|
| \ | \ |
| ~ | ·𝒩 |
| ` | \ |
| ; | ⁄ |
| : | ɣ |
| " | 𝒩 |
| [TAB] | ⌐ |

FIG. 11e

| Char | Stroke |
|---|---|
| ` | ⌒ |
| ' | 7 |
| " | N |
| " | W |
| + | ✗ |
| - | •— |
| x | ╱ |
| ÷ | ⊙⊙ |
| = | Z |
| • | . |
| ¿ | ⌒ |
| ¡ | P |
| [Home] | — |
| [End] | — |

| Char | Stroke |
|---|---|
| Ð | D |
| Ø | O |
| ʃ | S |
| § | S |
| ∞ | 8 |
| α | α |
| β | β |
| Δ | D |
| γ | γ |
| μ | M |
| π | h |
| [PgUp] | ↑ |
| [PgDn] | ↓ |

| Char | Stroke |
|---|---|
| Σ | E |
| Ω | O |
| º | O |
| ™ | M |
| ® | R |
| © | C |
| ¢ | C |
| ¥ | γ |
| £ | L |
| [Insert] | \| |
| [esc] | E |
| [alt] | ∧ |
| [ctrl] | ∧ |

FIG. 11f

MULTIPLE PEN STROKE CHARACTER SET AND HANDWRITING RECOGNITION SYSTEM WITH IMMEDIATE RESPONSE

RELATED APPLICATIONS

The present application claims priority to and is a continuation of the following previously filed applications: U.S. application Ser. No. 08/925,563, filed on Sep. 8, 1997, now U.S. Pat. No. 6,493,464, and incorporated herein by reference, which is a continuation of U.S. application Ser. No. 08/741,339, filed on Oct. 29, 1996, now abandoned, and incorporated herein by reference, and which is a continuation of U.S. application Ser. No. 08/270,025, filed on Jul. 1, 1994, now abandoned, and incorporated herein by reference.

BACKGROUND OF THE INVENTION

1. Field of the Invention

This invention relates to computer input systems in general, and more specifically to an apparatus and handwriting alphabet for use in a handwritten input and recognition system used in personal computing systems such as "palm-top" computers.

2. Description of Related Art

As computers have become increasingly popular for various applications, portable computers have been developed for a wide variety of uses. While many such portable computers use a traditional keyboard for input, for smaller computers, particularly including hand-held computers, the use of "pens" as an interface has been introduced as a way of making a small computer easier to use. With a pen interface, a user can place a pen or stylus directly on a touch-sensitive screen of the computer to control the software running on the computer and to input information. For many people, controlling a computer and entering text with a pen is more natural than using a keyboard.

An example of a prior art pen-based hand-held computer is shown in FIG. 1. The illustrated hand-held computer 1 is typically about 4 inches by 6.5 inches, with the majority of one surface comprising a touch-sensitive display screen 2. The display screen 2 is typically a liquid crystal display (LCD) having a resolution of 256×320 pixels (although larger or smaller pixel arrays could be used). Various technologies can be used to sense the location of a pen or stylus 3 touched against the surface of the LCD screen 2 to indicate to the computer's operating system the X-Y coordinates of the touch. Various hardware buttons 4 may be provided to control different functions, and/or to turn power on or off to the unit. In addition, a variety of software buttons or icons 5 may be provided, in known fashion, to indicate such functions as, for example, word processing or a delete function. Computer-generated information is typically shown on the display screen 2 as ASCII characters 6. One such hand-held computer is available as the "Zoomer" from Casio Corporation.

A common characteristic of such pen-based computers is the use of electronic "ink". "Ink" comprises a series or trail of pixels changed (e.g., darkened or lightened) as a pen 3 is moved across the display screen 2 by a user, thus mimicking the application of real ink to paper.

Some prior art system designers suggest the use of unrecognized handwritten ink input. Although this approach works well for recording notes for personal use, it is not always suitable for data entry into a file which needs to be searched at a later date. In addition, ink requires considerably more storage space than ASCII characters. Accordingly, practical pen-based computers need a method of inputing text which usually includes some form of recognition system.

Various methods of recognizing handwriting are well known. One prior art approach is to provide a series of boxes in the input area (which is usually the display area) for entering character information. These systems use boxes for entry of text in an attempt to improve accuracy of recognition and to separate one character from the next. In these systems, an array of boxes is displayed and the user writes one character in each box. Although the boxes aid in improving the accuracy of recognition, most people find it awkward to write in boxes. Additionally, due to the number of boxes necessary to capture even a short sentence, these systems are not very practical in a palm-top computer having a reduced data input area.

Another character recognition system is described in U.S. Pat. No. 5,125,039, entitled "Object Recognition System", by the inventor of the present invention. In such a system, the user writes text without boxes in a free form manner. After a user inputs several ink characters, the computer applies special algorithms to separate the ink strokes into characters and then recognize each ink character as an ASCII character. It then replaces the ink representation of the characters drawn by the user with the standardized ASCII representation of those characters. Although these systems require less input area than boxed input systems, they are still difficult to implement on a palmtop computer having a small display. In addition, the computer has the additional burden of figuring out where one character ends and the next begins. This leads to recognition errors.

One additional major difficulty presented by prior art handwriting recognition systems is the delay time between text input and text recognition. The prior art systems typically require between 2 to 5 seconds after the user writes the ink character on the input tablet to recognize and display the ASCII character on a display device. In typical use, the prior art systems require the user to write a few words and then wait several seconds for the computer to start the recognition process. Alternatively, some systems (e.g., the "Newton" from Apple Computer) perform recognition without the user stopping and waiting. But in these systems, the words are still recognized several seconds after they are written. In all cases, the user cannot immediately realize when a recognition mistake has occurred. This type of handwritten text recognition system makes error correction difficult because the user must constantly look at the display for words which the user input several seconds before in order to be sure that text was correctly entered and correctly interpreted. Moreover, once a user detects an error, error correction is difficult because the user has to first select the word or characters which need to be corrected.

In summary, three of the major problems with current handwriting recognition systems are the delay from writing to recognition, the limited writing area of palmtop computers, and the difficulty of accurately recognizing separate characters in non-boxed entry systems.

Therefore, an improved pen data entry solution is needed which can accurately and efficiently recognize text on a small display. It has become evident that one crucial characteristic of such an improved solution is the ability to instantaneously (i.e., with little or no perceptible delay) recognize and display input text, similar to the response of currently available personal computers using keyboard input devices. Palm-top computers having the ability to instantly recognize and display text offer the user the opportunity to quickly recognize and correct mistakes. Instant recognition also permits the use of smaller input areas because the input area can be reused for writing subsequent characters.

One of the major impediments facing "instant" handwritten text recognition systems is presented by the multiple stroke (multi-stroke) characteristic of many English text characters. That is, many characters comprise more than one pen stroke. In this context, a single pen stroke is defined as a continuous movement of a pen while maintaining contact with a writing tablet. For example, the letters "T", "H," and "E" typically comprise multiple pen strokes, while the letters "S" and "O" typically comprise a single pen stroke. Prior art recognition systems have had difficulty in achieving essentially "instantaneous" recognition due to the fact that characters may comprise more than one pen stroke.

For example, due to the possibility that any given input character might be a multi-stroke character, it has been difficult to determine when a user has completed writing a one stroke (unistroke) character, or when the user is continuing to write a multi-stroke character. For example, a vertical line might represent the letter "I" or it could represent the first stroke in the multi-stroke letters "T", "H" or "E". In the past, recognition systems have solved this ambiguity by waiting until the user stopped writing, or by having a fixed delay period after which characters were recognized, or by detecting the start of a next stroke sufficiently far from prior strokes as to indicate a new character. Each of these approaches are deficient due to the recognition time delays introduced.

Recently, two approaches have been attempted for immediate recognition of handwritten text. Neither of these two approaches has proven wholly satisfactory. The first approach is offered by Sharp Electronics of Japan in their PVF1 handheld computer system, which provides "immediate" recognition of both English and Japanese characters. The Sharp system uses a modified boxed input method. It displays several adjacent boxes on a screen for text input. Every text character is written into one of the boxes. Recognition timing delays are reduced because the system knows to begin recognizing a character previously written into a first entry box as soon as the user begins writing into an another entry box. The recognized character is subsequently displayed upon the screen (not in the box) as soon as the recognition process completes. Expert users can quickly enter multiple characters by alternating between two adjacent boxes. This is different from previous boxed input systems where the user wrote characters in a left to right fashion in a multitude of boxes. The Sharp approach achieves faster recognition response on a reduced display area than previous systems. However, it suffers from several disadvantages.

Although the Sharp system uses fewer boxes (as little as two will suffice), the boxes still occupy a significant amount of screen area. In addition, as with all boxed input systems, the user has to be careful to always write within the box. If one stroke of a multi-stroke character falls outside the box, the character will be recognized incorrectly. This requires the user to carefully look at the screen at all times while writing. Another, and more serious drawback, is that the recognition of characters is not completely "instant". In this system, recognition of one character does not commence until the user starts writing a subsequent character. Although this system represents an improvement over the prior art systems where recognition delays were longer, recognition is still delayed. So, when the user writes just one character, or when the user writes the last character in a sequence, that character is not recognized until after a pre-determined time-out delay. This delay after writing a single character makes it frustrating and therefore impractical to make quick editing changes such as writing a "backspace" character, or to insert a single character.

A second approach at immediate recognition of handwritten text was recently described by Xerox Corporation of Palo Alto, Calif. Xerox teaches a method whereby every character that a user wishes to write is represented by a single stroke glyph. Because every character is represented using a single stroke, recognition commences as soon as the user lifts the pen from the writing tablet. The system provides improved recognition speeds over the Sharp approach and avoids the problems associated with the writing boxes used in the Sharp system.

However, the Xerox method suffers from two major disadvantages. First, the Xerox approach is difficult to learn because it requires the user to memorize an entirely new alphabet for entering text. The alphabet is specially designed to maximize the recognition abilities of the computer, not to maximize ease of learning. The Xerox disclosure recognizes this difficulty yet submits that the inefficiency of learning the alphabet is compensated by the improved recognition speeds once the user becomes an expert.

Second, the Xerox approach is difficult to implement with a full set of characters. The user must learn a single stroke representation for every possible character. Although this task may be feasible when representing only the 26 letters of the English alphabet in one case (upper or lower), there are many more characters requiring representation and recognition. For example, both upper and lower case English characters must be recognized. European languages have multiple accented characters as well as many other unique characters. In addition, a myriad of punctuation marks and mathematical symbols require representation. Assigning each of these characters to a unique single stroke glyph requires inventing many strange and novel glyphs that are non-intuitive and therefore difficult to learn by the average user. Compounding this difficulty is the problem of similarly looking accented characters (for example, A, Á, À, Ä, and Â). Assigning unique glyphs for these characters would make the extended alphabet especially non-intuitive and difficult to learn.

The limitations of a unistroke alphabet as taught by Xerox are magnified when trying to create an immediate recognition system for Asian languages. For example, it is nearly impossible to define single stroke alphabets for Asian symbols, such as Japanese katakana or hiragana, Chinese kanji, or Korean hangul, due to the large number of symbols that need to be represented.

Accordingly, there is a need for an improved handwritten text recognition system capable of instantaneously and accurately recognizing handwritten text entries. There is also a need for an improved handwritten text entry and recognition system which is user-friendly, easy to learn, and easy to implement.

The present invention provides such a handwritten text recognition system.

SUMMARY OF THE INVENTION

The present invention uses a pen or stylus as an input device to a pen-based computer handwriting recognition system capable of interpreting a special pre-defined set of character strokes or glyphs. The invention teaches a system which provides true immediate character recognition, yet allows characters to be written with any number of strokes, thus making it natural to use and easy to learn. The present invention defines three different categories of pen strokes: (1) pre-character modifier strokes, (2) character or symbol strokes, and (3) post-character modifier strokes.

Pre-character modifier strokes precede character strokes and inform the present recognition system that subsequently entered character strokes are to be modified by the pre-character modifier stroke in a defined manner. They function primarily to control the interpretation of a subsequently entered character stroke. For example, a pre-modifier control stroke may indicate that the next character stroke is to be interpreted as a punctuation character. Pre-character modifier strokes may or may not cause an immediate visible display change. In the preferred embodiment of the invention, pre-character modifier strokes do result in a display change (by either changing a status indicator or by displaying a temporary character), so the user knows the pre-character modifier stroke was successfully entered.

Character strokes always cause a letter or other symbol to be displayed the moment the stroke is input on the writing tablet, interpreted in accordance with any pre-character modifier strokes previously entered. Any status indicators or temporary characters displayed due to earlier pre-character modifier strokes are removed upon recognizing a character stroke.

Post-character modifier strokes cause the recognition system to modify, in a defined manner, a character or symbol which was previously entered and displayed. For example, a post-character modifier may be used to add a diacritical mark to a character.

An important advantage of the present invention is its ability to recognize characters consisting of multiple pen strokes yet still provide instantaneous recognition and display of the recognized character. By combining mutually exclusive pre-character modifier strokes, character strokes, and post-character modifier strokes, a myriad of alpha, numeric, punctuation, and accented characters may be entered with natural and easy to learn styles.

The use of the three different types of strokes guarantees that the system always knows whether the user is starting a new character, has completed a character, or is modifying a previously recognized character. This enables the system to provide the immediate response that is desired.

It will be shown that the present invention is flexible and can be used to enter not only English and other Roman character-based languages, but other written alphabets, such as Japanese hiragana and katakana.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 3 shows the pen strokes used to represent the 26 letters of the ordinary English alphabet in a prior art system taught by Xerox.

FIG. 4a shows the pen strokes used to represent the 26 letters of the ordinary English alphabet in the preferred embodiment of the present invention.

FIG. 4b shows the pen strokes used to represent the 10 numbers of the Arabic number system in the preferred embodiment of the present invention.

FIG. 5a shows the pen strokes used as character strokes to represent three common "non-printing" characters (the space, the backspace, and the carriage return) in the preferred embodiment of the present invention.

FIG. 5b shows the pen strokes used as pre-character modifier strokes to create capitalized characters, punctuation, and extended characters in the preferred embodiment of the present invention.

FIG. 5c shows the pen strokes used to represent common punctuation symbols when preceded by the pre-character modifier stroke for punctuation in the preferred embodiment of the present invention.

FIG. 6 shows the pen strokes used to represent several extended symbols when preceded by the pre-character modifier stroke for extended symbols in the preferred embodiment of the present invention.

FIG. 7a shows the pen strokes used in the preferred embodiment of the present invention as post-character modifier strokes to add accents to letters created with a character stroke and none or more pre-character modifier strokes.

FIG. 7b shows several examples of writing accented characters using multiple pen strokes used in the preferred embodiment of the present invention.

FIG. 7c shows an example of writing an upper case accented character using a pre-character modifier stroke, a character stroke, and a post-character modifier stroke.

FIG. 8 shows the dictionary mapping used to enter katakana characters. Each of these entries consists of either a single character stroke, a pre-character modifier stroke combined with a character stroke, or two pre-character modifier strokes combined with a character stroke. This mapping follows the well known romaji input system.

FIG. 9 shows the sequence of strokes and the resulting display when entering a three stroke katakana character.

FIG. 10 shows the dictionary mapping used to enter special two katakana character sequences. Each of these entries consists of two pre-character modifier strokes and one character stroke. This mapping follows the well known romaji input system.

FIG. 11a shows named pen strokes useful for defining various symbols in the preferred embodiment of the present invention.

FIG. 11b shows variations of the pen strokes that can be used to represent the 26 letters of the ordinary English alphabet in the preferred embodiment of the present invention.

FIG. 11c shows the pen strokes used as character strokes to represent common "non-printing" characters in the preferred embodiment of the present invention.

FIG. 11d shows the pen strokes used as character strokes to represent common punctuation characters in the preferred embodiment of the present invention.

FIG. 11e shows the pen strokes used as character strokes to represent additional punctuation characters in the preferred embodiment of the present invention.

FIG. 11f shows the pen strokes used as character strokes to represent extended characters in the preferred embodiment of the present invention.

FIG. 11g shows the pen strokes used as character strokes to represent non-accented foreign characters in the preferred embodiment of the present invention.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

The present invention is preferably implemented as a computer program operating on a pen-based computer system such as the "Zoomer" and "Newton" products described above. The computer program is stored on a storage media or device readable by a computer, and configures and operates the computer when the storage media or device is read by the computer, the computer being operated to determine, recognize, classify, and sometimes display handwritten strokes. However, as is known in the art, the logic functions of such a computer program may be implemented as an electronic system, such as a firmware programmed, microcoded, or hardwired logic system.

Figure 1:
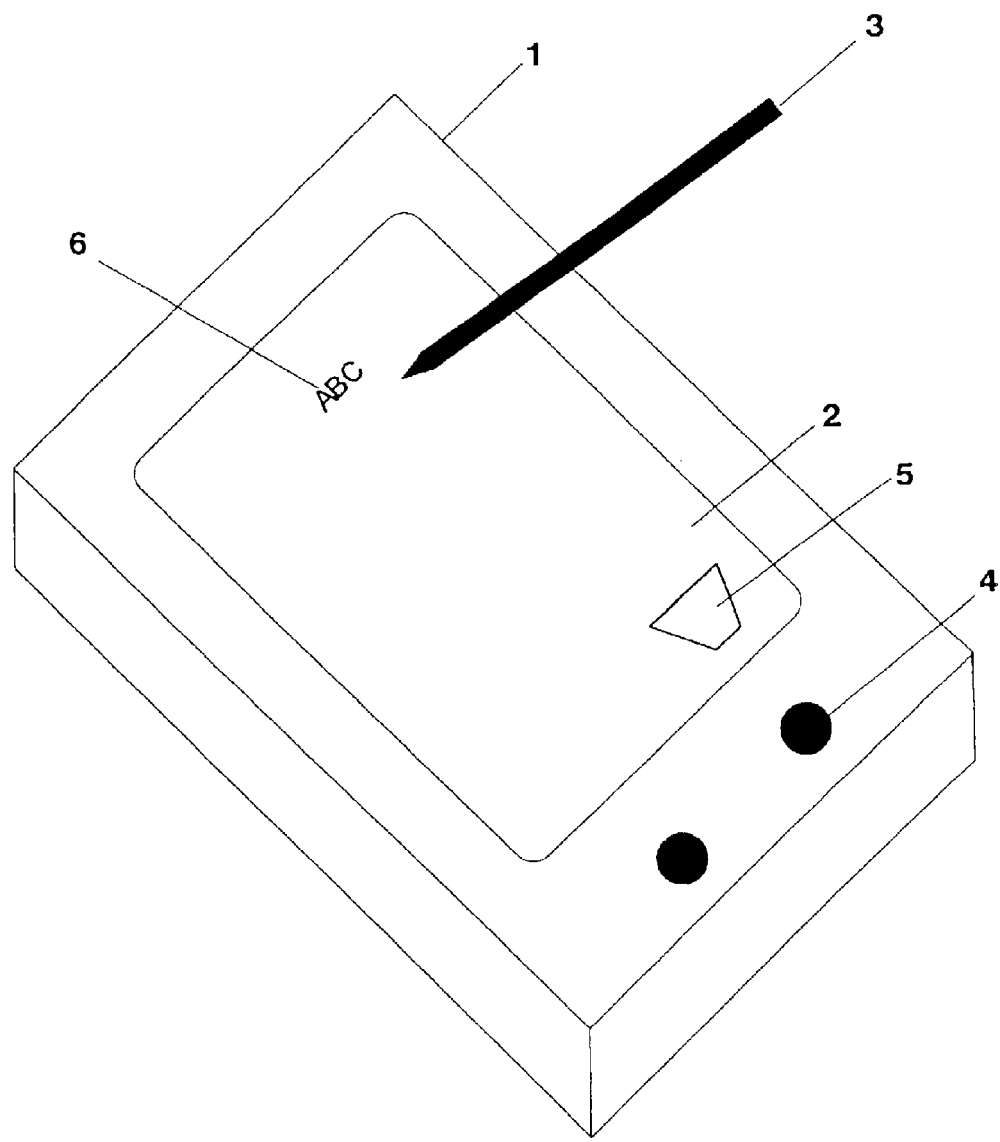
FIG. 1 is a front left-side perspective drawing showing a prior art pen-based hand-held computer.
Figure 2:
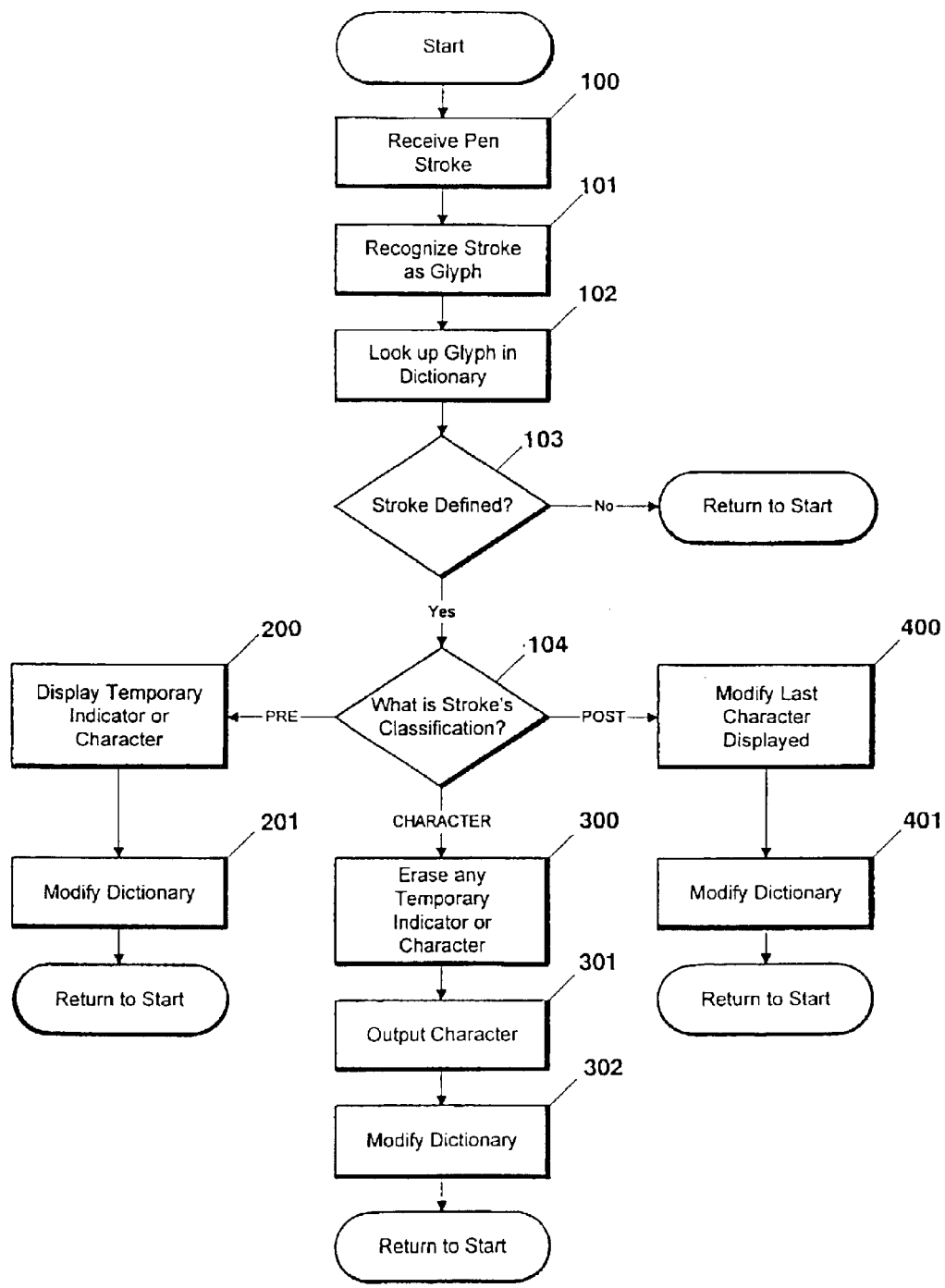
FIG. 2 is a flow chart describing the preferred embodiment of the handwriting recognition system of the present invention.

FIG. 2 is a flow chart that describes the basic process of the invention. Operation starts at step 100, where a pen stroke is received. A stroke is a movement by a user of a pen or equivalent input device on a tablet, pad, or digitizer. A stroke begins when the pen touches the tablet, and ends when the user removes the pen from the tablet. The position and movement of the pen during the stroke is converted into a series of X-Y coordinates. This pen-position data is received from the pen input device and passed to the glyph recognizer portion of the character input system.

In step 101, the glyph recognizer logic recognizes the pen-stroke data as being a rendition of a particular glyph based on the movement and shape of the input stroke. The recognition procedure used by the present invention is essentially that disclosed in U.S. Pat. No. 5,125,039, entitled Object Recognition System, issued to Jeffrey Hawkins, one of the present inventors. This patent is incorporated herein by reference.

In step 102, a dictionary is consulted to look up how the current glyph is to be interpreted. Associated with each glyph is a definition, which includes the current classification of the glyph as a pre-character modifier stroke, a character (meaning any symbol) stroke, a post-character modifier stroke, or as a currently unassigned stroke. The definition of each glyph also includes what character or other indicator, if any, is to be output in response to a stroke that matches that glyph. It also includes a specification of what changes if any, are to be made to any glyph definitions in response to a stroke that matches that glyph.

Steps 103 and 104 are decision steps. Different actions are taken depending on whether the current stroke represents a pre-character modifier stroke, a character stroke, a post-character modifier stroke, or an unassigned stroke. In the case of pre-character modifier strokes, control passes to step 200.

In step 200, the processing logic causes an indication to be made that a particular pre-character modifier stroke has been input. While the pre-character modifier stroke does not result in a character being output from the character recognizer, it is nevertheless desirable to display to the user an indicator of what pre-character modifier stroke was received. In the preferred embodiment of the invention a character is displayed which is representative of the pre-character modifier stroke. For example, if a simple "tap" or "dot" pre-character modifier stroke is used to interpret the next character stroke as a punctuation symbol, then a bullet or "dot" character could be displayed indicating that the dot stroke was entered successfully. These characters are temporary and will be removed in step 300.

In step 201, the definition in the glyph dictionary of one or more glyphs is modified according to the input pre-character modifier stroke, as further described below.

In step 300, if the class of the current stroke is "character", then any previously displayed indicators or characters representing pre-character modifier strokes are deleted and removed from the display.

The definition of the corresponding glyph in the dictionary includes the character that is to be output in response to receiving strokes matching that glyph. In step 301, the processing logic outputs that character for display.

In step 302, the definition in the glyph dictionary of one or more glyphs is modified according to the character stroke entered and the current state of the dictionary, as further described below.

In step 400, if the class of the current pen stroke is "post-character modifier", then the processing logic causes the most recently output character to be removed and replaced with a new or modified character. In the preferred embodiment, the prior character is removed by sending a "backspace" character to the display system. The new or modified character is determined by the glyph definition corresponding to the post-character modifier stroke.

In step 401, the definition in the glyph dictionary of one or more glyphs is modified according to the post-character modifier stroke entered and the current state of the dictionary, as further described below.

At any point in time, the glyph dictionary specifies exactly one interpretation for each input glyph that the system knows how to recognize. It is possible for that interpretation to be to ignore that glyph. For example, the glyph which looks like a pair of eyeglasses (see FIG. 5c) is not active in the initial dictionary definitions. When a stroke corresponding to that glyph is received when that glyph is not active, the stroke is recognized, but ignored. At other times however, the eyeglasses glyph will not be ignored. For example, after the recognition of a character stroke for a "u" or "a", the eyeglasses glyph becomes active as a post-character modifier stroke and corresponds to the umlaut accent. If the eyeglasses glyph is then input, the original "u" or "a" input character will be changed to "ü" or "ä". Similarly, after a pre-character modifier stroke for punctuation, the eyeglasses glyph is defined as a character stroke representing the percent "%" character.

At any point in time, each stroke that is recognized must be a pre-character modifier stroke, a character stroke, a post-character modifier stroke, or unassigned. It cannot at a any point in time have multiple classifications. Nevertheless, any stroke, when recognized, may modify the definition of any or all glyphs so as to reclassify them. Thus, a particular glyph may correspond sometimes to a character stroke, and at other times to a post-character or pre-character modifier stroke.

Steps 201, 302, and 401 all modify the dictionary to reassign the definitions of glyphs. There are numerous ways the dictionary can be organized to allow for this modification. In the preferred embodiment of the present invention, the dictionary is implemented as a tree data structure. The root level of the tree contains definitions for all the pre-character modifier strokes and character strokes defined in the initial state of the system. When one of these strokes is entered, there may be a subsequent branch defined for that stroke which contains new definitions for all the glyphs. Each stroke leads to a new point in the tree data structure, thus modifying the dictionary. Implementing the dictionary as a tree data structure is flexible and allows the dictionary to be located in ROM. Other methods for organizing the dictionary would be possible, as known in the art.

Figure 3:
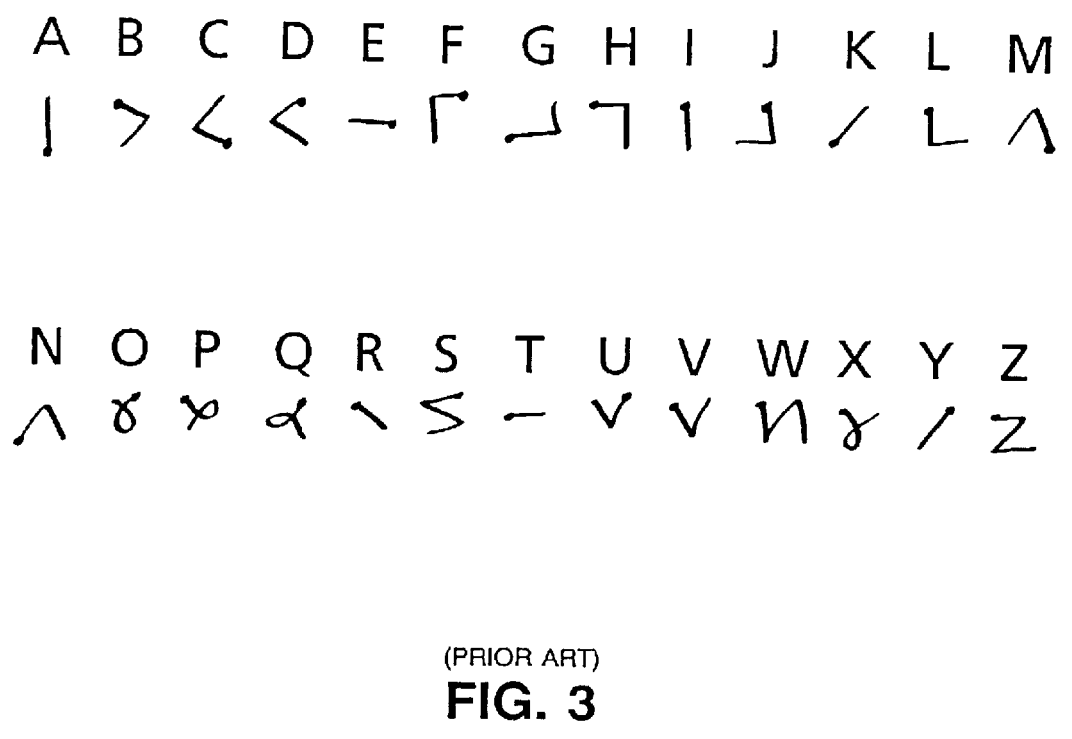

FIG. 3 shows the glyphs taught in the prior art referenced earlier from Xerox for entering the English alphabet (in this and subsequent figures, a dot at one end of a stroke indicates that the stroke is drawn starting at that end.) This system achieves immediate recognition by forcing every character to be input with only a single stroke. This rigid unistroke approach makes it difficult to extend the character set significantly beyond the base alphabet. Xerox does not teach any method for punctuation, accented characters, extended characters, upper case letters, numbers, or other non-Roman alphabets. The Xerox alphabet was also designed for speed of entry and simplicity of recognition. This results in a glyph set that looks unfamiliar and is difficult to learn.

FIG. 11a shows named pen strokes useful for defining various symbols in the preferred embodiment of the present invention. These strokes, variations of these strokes, and other strokes, as character strokes, pre-character modifier strokes, and post-character modifier strokes, can be defined to represent essentially any character or symbol.

FIG. 4a shows the glyph set used in the preferred embodiment of the present invention for entering the English alphabet. This alphabet was chosen to be as familiar as possible and easy to learn, yet adhere to the principles taught in this invention. Most of these alphabet characters are written with a single character stroke. However, the present invention teaches a method of achieving immediate recognition with multiple strokes. It was found through user testing that most people had difficulty learning any single stroke "X". Therefore, in the base alphabet, "X" is written with two sequential strokes. The first stroke going from the upper left to the lower right is a pre-character modifier stroke, and the second stroke going from the upper right to the lower left is a character stroke. User testing has shown that this two stroke combination is far easier to write than any one stroke "X".

The alphabet shown in FIG. 4a provides near 100% recognition accuracy, yet is easy to learn and use due to its obvious similarity to natural handwriting styles. FIG. 11b shows that there are actually multiple ways (different strokes) which can be used to write many of these letters, making the system even easier to learn and use. The recognition system simply maps the input strokes for these letters to the same output symbol in the glyph dictionary. For example, there are two ways to write a "Y": the glyph shown in FIG. 4a, and a shape similar to a lower case scripted "Y" as shown in FIG. 11b. User testing has shown that some users prefer one method and some prefer the other.

FIG. 4b shows the glyph set used in the preferred embodiment of the present invention for entering the digits 0 through 9. Many of these glyphs are also used to enter letters of the alphabet. One method of overcoming this ambiguity problem is to have a separate numeric mode where a user only can enter digits. This numeric mode can be entered by pressing a button on the display of the computer, by writing a "num-lock" glyph, or other means. In the preferred embodiment of the present invention, a user can enter and exit a numeric mode by either tapping an on-screen icon or by writing a "forward slash" stroke (a slanted line written from bottom left to upper right). Testing has shown that occasionally a user forgets to exit numeric mode after writing several digits. A refinement of the present invention helps fix this problem by automatically exiting numeric mode when the user writes a character stroke which can only be interpreted as a letter or when the user writes the pre-character modifier stroke for capital letter shift.

FIG. 5a shows the glyph set used in the preferred embodiment of the present invention for entering three common "non-printing" characters: the space, the backspace, and the carriage return. A recognition system with immediate response operates in many ways more like a keyboard than a conventional handwriting recognition system. For example, because users see results instantly, they find it more natural to "backspace" over an incorrect character than write over it or delete it with a gesture. Therefore, simple character strokes may be provided for space, backspace, carriage return, and other keyboard equivalents. FIG. 11c details other non-printing keyboard equivalents.

FIG. 5b shows the glyph set used in the preferred embodiment of the present invention as pre-character modifier strokes for the English language. The three strokes are used to respectively indicate that the subsequent character stroke represents a capital letter, a punctuation character, or an extended character. If desired, other pre-character modifier strokes may be defined as "sticky" shift strokes that take effect until reset. For example, a "caps lock" stroke would cause all subsequent strokes to be interpreted as if the pre-character modifier "caps" stroke had been entered before each subsequent stroke.

FIG. 5c shows the glyph set used in the preferred embodiment of the present invention for entering common punctuation symbols. All of these glyphs are classified as character strokes when preceded by a pre-character modifier stroke representing punctuation characters. As shown in FIG. 5b, a "dot" stroke is used in the preferred embodiment of the invention to indicate a punctuation character. A more complete list of preferred punctuation characters is shown in FIG. 11d and FIG. 11e.

FIG. 6 shows the glyph set used in the preferred embodiment of the present invention for entering several extended symbols. All of these glyphs are classified as character strokes when preceded by a pre-character modifier stroke representing extended symbol characters. As shown in FIG. 5b, a "slash" stroke is used in the preferred embodiment of the invention to indicate an extended symbol character. A more complete list of preferred extended symbols is shown in FIG. 11f.

FIG. 7a shows the glyph set used in the preferred embodiment of the present invention for adding accents or diacritical marks to letters. These glyphs are classified as post-character modifier strokes after entering a letter which is capable of being accented.

FIG. 7b shows several examples of how a user would write an accented character using a two stroke combination of a character stroke and a post-character modifier stroke. Writing these accented characters using the present invention is very similar to how the user would write them on paper. First, the user writes a base letter, then adds an accent. After writing the base letter stroke, the corresponding character is immediately output to the display. Upon writing the accent post-character modifier stroke the base letter is erased and replaced with the correct accented letter. Thus, the system achieves an immediate recognition response on a multiple stroke character even though it is initially unknown whether the user is writing a single stroke letter or a multiple stroke accented letter.

FIG. 7c shows an example of how a user would write an accented upper case character using a three stroke combination of a pre-character modifier stroke, a character stroke, and a post-character modifier stroke. The strokes are numbered in the order they are written. First, the user writes a pre-character modifier stroke indicating that the following character should be capitalized. This causes the display of a temporary character indicating the acceptance of the stroke, in this case an "up arrow" character. Next, the user writes a character stroke. The temporary character is removed and replaced by the appropriate upper case letter. Lastly, the user writes a post-character modifier stroke, causing the base upper case letter to be erased and replaced with the correct upper case accented letter.

The present invention is quite flexible and can accommodate many different types of languages, alphabets, and symbol systems. FIG. 8 illustrates one method of how the invention can be adapted to quickly and easily enter the Japanese katakana alphabet. In Japan, a common method for entering katakana with a keyboard is called the "romaji" method. In the romaji method, a user types the English phonetic equivalent of the katakana characters. For example, to enter the katakana for "sushi", the user types "su" which results in the display of the corresponding katakana symbol. Then the user types "shi", which results in the display of the corresponding katakana symbol. All of the approximately 90 katakana characters can be input with combinations of one, two, or three typed letters. The present invention can duplicate this method simply with a change to the dictionary of glyph mappings. In the preferred embodiment of a katakana stroke recognition system in accordance with the present invention, the new dictionary assigns strokes representing the consonants "BCDGHKMNPRSTXYZ" as pre-character modifier strokes and assigns strokes representing the vowels "AEIOU" as character strokes. Some katakana characters are entered with just one character stroke. Some katakana characters are entered with one pre-character modifier stroke and one character stroke. Some katakana characters are entered with two pre-character modifier strokes and one character stroke. In the latter case, two temporary indicator characters are preferably displayed, representing the two pre-character modifier stokes. Both temporary characters are deleted and replaced with the final katakana character upon entering the character stroke. This sequence is illustrated in FIG. 9.

FIG. 10 shows how special double katakana symbol combinations can be entered with three stroke combinations of two pre-character modifier strokes and one character stroke. This mapping still follows the romaji method common in Japan. It illustrates the flexibility of the present invention by showing how a character stroke can result in the display of more than one character or symbol. In principle, a character stroke or post-character modifier stroke can result in the output and display of any length sequence of characters.

There are many fine points in this particular implementation which are not detailed here but would be obvious to anyone experienced in the romaji input system and familiar with the present invention. For example, the stroke representing the letter "N" is initially a pre-character modifier stroke. Once entered it is reassigned as a character stroke. This permits the entry of the "NN" katakana symbol, which is an exception to the general consonant-vowel pairing for katakana.

FIG. 11g shows the pen strokes used as character strokes to represent non-accented foreign characters in the preferred embodiment of the present invention.

The principles of the present invention can be extended to other characters sets, such as Japanese hiragana, Chinese kanji, or Korean hangul. The concepts of the present invention also can be extended to provide greater flexibility for users. For example, the computer system could be programmed to allow a user to define new input strokes, and/or to associate symbols, characters, or even complete words or phrases, to a combination of input strokes. Thus, a user-maintained glossary could be built where the user could define the sequences of characters—or symbols, text, or program functions—to be associated with a stroke, a multi-stroke combination, or sequence of multiple stroke combinations. Alternatively, the user could also define new strokes within a table (or other data structure) and assign context to each such stroke.

Summary

The present recognition system provides several improvements over prior art systems by achieving immediate recognition of multiple stroke characters without using boxes for input. It improves over prior art systems by immediately displaying every character written as soon as the user finishes the character. No unnecessary delays are incurred, nor are additional actions required of a user to translate input. The immediate response helps a user to quickly identify mistakes and correct them. The present system accomplishes this immediate response while at the same time accommodating characters which are more easily learned and written using multiple strokes. Examples provided above include accented characters, punctuation characters, extended symbols, the letter "X", and the katakana character set. Defining characters with multiple strokes makes the present invention much easier to use and learn than prior art systems requiring single stroke only characters.

Another advantage provided by the present recognition system is that large sets of characters can be represented without relying on a large set of unique strokes or glyphs. For example, accented letters use the same base character stroke as their unaccented counterpart letters. Similarly, punctuation marks and capitalized letters are realized using a combination of pre-modifier control strokes and character strokes. The present invention provides an additional advantage over prior art systems because the present system does not require multiple writing boxes or other large onscreen gadgetry. Valuable display space is thereby saved, allowing the present system to be used on very small devices.

The present system also teaches an alphabet for inputing Roman-character based languages which, although not identical to a user's conventional writing style, is very similar and therefore easy to learn. A user can achieve near 100% recognition accuracy when using this alphabet, yet it is very easy to learn and use because it is very similar to a natural writing style.

A number of embodiments of the present invention have been described. Nevertheless, it will be understood that various modifications may be made without departing from the spirit and scope of the invention. For example, while particular strokes and associations for such strokes have been disclosed, the invention encompasses other strokes, combinations, and associations. Further, as noted above, a stroke may be associated with any context, such as character(s), symbol(s), text, or program functions. The term "character" should thus be understood to encompass any of these contexts. Accordingly, it is to be understood that the invention is not to be limited by the specific illustrated embodiment, but only by the scope of the appended claims.

What is claimed is:

1. A method used for interpreting a plurality of input strokes entered on an electronic input writing device and displaying corresponding characters, comprising:

storing data that defines sets of glyphs, the sets of glyphs including a first set of glyphs and a second set of glyphs;

wherein the data associates each member of the first set of glyphs with at least one character to display;

wherein each member of a majority of said first set of glyphs has a graphical appearance that substantially resembles a Roman alphabet character;

receiving a first stroke of a plurality of strokes;

wherein each stroke of said plurality of strokes is a single continuous movement of a pen device while in contact with said electronic input writing surface;

in response to detecting the completion of said first stroke, immediately:
  determining based on said data that said first stroke corresponds to:
    a first glyph in the first set of glyphs, and
    a first character corresponding to the first glyph, and causing the display of said first character;
receiving a second stroke of said plurality of strokes;
in response to detecting the completion of said second stroke, immediately determining, based on said data, that said second stroke corresponds to a second glyph in the second set of glyphs;
receiving a third stroke of said plurality of strokes; and
in response to detecting the completion of said third stroke, immediately determining, based on said data and the determination that said second stroke corresponds to said second glyph, that said third stroke corresponds to:
  the first glyph in the first set of glyphs, and
  another character different than said first character.

2. The method of claim 1, wherein the data associates each member of said first set of glyphs with a Roman alphabet character.

3. The method of claim 1, wherein the first character is a lower case version of a letter in the Roman alphabet and the other character is a capital version of the letter.

4. The method claim 1, wherein the step of storing data includes storing data on a handheld computer which incorporate said electronic input writing device.

5. The method of claim 1, wherein in response to determining that said third stroke corresponds to a first glyph in the first set of glyphs, immediately causing display of the other character before interpreting any subsequently detected stroke of said plurality of strokes.

6. A method used for interpreting a plurality of input strokes entered on an electronic input writing device and displaying corresponding characters, comprising:
  storing data that defines sets of glyphs, the sets of glyphs including a first set of glyphs and a second set of glyphs;
  wherein the data associates each member of the first set of glyphs with at least one character;
  receiving a first stroke of a plurality of strokes;
  wherein each stroke of said plurality of strokes is a single continuous movement of a pen device while in contact with said electronic input writing surface;
  in response to detecting the completion of said first stroke, immediately determining based on said data that said first stroke corresponds to:
    a first glyph in the first set of glyphs, and
    a first character corresponding to the first glyph;
  in response to determining that said first stroke corresponds to the first glyph, causing a display of the first character;
  receiving a second stroke of said plurality of strokes;
  in response to detecting the completion of said second stroke, immediately determining, based on said data, that said second stroke corresponds to a second glyph in the second set of glyphs; and
  in response to determining that said second stroke corresponds to a second glyph in the second set of glyphs, immediately causing the replacement of the display of the first character with a display of another character different than said first character.

7. The method of claim 6,
wherein before receiving said first stroke said second glyph is a member of said first set of glyphs; and
wherein determining that said first stroke corresponds to the first glyph causes said second glyph to be treated as a member of the second set of glyphs to perform the step of determining that said second stroke corresponds to a second glyph in the second set of glyphs.

8. The method claim 6, wherein the step of storing data includes storing data on a handheld computer which incorporates said electronic input writing device.

9. The method of claim 6, wherein the data associates each member of said first set of glyphs with a Roman alphabet character.

10. The method of claim 9, wherein the other character is an accented version of said first character.

11. A computer-readable medium carrying one or more sequences of instructions which, when executed by one or more processors, causes the one or more processors to perform the method recited in claim 1.

12. A computer-readable medium carrying one or more sequences of instructions which, when executed by one or more processors, causes the one or more processors to perform the method recited in claim 2.

13. A computer-readable medium carrying one or more sequences of instructions which, when executed by one or more processors, causes the one or more processors to perform the method recited in claim 3.

14. A computer-readable medium carrying one or more sequences of instructions which, when executed by one or more processors, causes the one or more processors to perform the method recited in claim 4.

15. A computer-readable medium carrying one or more sequences of instructions which, when executed by one or more processors, causes the one or more processors to perform the method recited in claim 5.

16. A computer-readable medium carrying one or more sequences of instructions which, when executed by one or more processors, causes the one or more processors to perform the method recited in claim 6.

17. A computer-readable medium carrying one or more sequences of instructions which, when executed by one or more processors, causes the one or more processors to perform the method recited in claim 7.

18. A computer-readable medium carrying one or more sequences of instructions which, when executed by one or more processors, causes the one or more processors to perform the method recited in claim 8.

19. A computer-readable medium carrying one or more sequences of instructions which, when executed by one or more processors, causes the one or more processors to perform the method recited in claim 9.

20. A computer-readable medium carrying one or more sequences of instructions which, when executed by one or more processors, causes the one or more processors to perform the method recited in claim 10.

* * * * *